(12) United States Patent
Lin et al.

(10) Patent No.: US 10,628,919 B2
(45) Date of Patent: Apr. 21, 2020

(54) IMAGE SEGMENTATION METHOD AND APPARATUS

(71) Applicant: HTC Corporation, Taoyuan (TW)

(72) Inventors: Cheng-Hsien Lin, Taoyuan (TW); Po-Chuan Cho, Taoyuan (TW); Hung-Yi Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 233 days.

(21) Appl. No.: 15/981,919

(22) Filed: May 17, 2018

(65) Prior Publication Data

US 2019/0066265 A1 Feb. 28, 2019

Related U.S. Application Data

(60) Provisional application No. 62/552,412, filed on Aug. 31, 2017.

(51) Int. Cl.
| | |
|---|---|
| *G06T 7/10* | (2017.01) |
| *G06T 3/40* | (2006.01) |
| *G06N 3/04* | (2006.01) |
| *G06N 5/04* | (2006.01) |
| *G06T 7/11* | (2017.01) |

(52) U.S. Cl.
CPC ......... *G06T 3/4046* (2013.01); *G06N 3/0454* (2013.01); *G06N 5/046* (2013.01); *G06T 7/10* (2017.01); *G06T 7/11* (2017.01); *G06T 2207/20084* (2013.01)

(58) Field of Classification Search
CPC ............. G06T 7/10–194; G06T 3/4046; G06T 2207/20084; G06N 3/0454; G06N 5/046
See application file for complete search history.

(56) References Cited

U.S. PATENT DOCUMENTS

| | | | | |
|---|---|---|---|---|
| 10,290,107 | B1* | 5/2019 | Casas | G06N 3/084 |
| 2016/0104053 | A1* | 4/2016 | Yin | G06K 9/00228 |
| | | | | 382/156 |
| 2018/0350077 | A1* | 12/2018 | Lin | G06T 7/10 |
| 2019/0034714 | A1* | 1/2019 | Barth | G06N 3/08 |
| 2019/0050681 | A1* | 2/2019 | Tate | G06K 9/6232 |
| 2019/0066265 | A1* | 2/2019 | Lin | G06N 3/0454 |
| 2019/0066268 | A1* | 2/2019 | Song | G06N 3/0454 |
| 2019/0130575 | A1* | 5/2019 | Chen | G06T 7/11 |
| 2019/0147221 | A1* | 5/2019 | Grabner | G06K 9/00214 |
| 2019/0205700 | A1* | 7/2019 | Gueguen | G06T 7/174 |
| 2019/0236411 | A1* | 8/2019 | Zhu | G06K 9/4628 |
| 2019/0266418 | A1* | 8/2019 | Xu | G06K 9/00718 |

(Continued)

*Primary Examiner* — Sean T Motsinger
(74) *Attorney, Agent, or Firm* — CKC & Partners Co., LLC (57) ABSTRACT

An image segmentation method for performing image segmentation through a neural network implemented by an image segmentation apparatus is provided. The image segmentation method includes the steps outlined below. An input image is down-sampled to generate down-sampled images. Previous convolution neural network (CNN) data having a first resolution is received to up-sample the previous CNN result to generate an up-sampled previous CNN data having a second resolution. A current down-sampled image of the down-sampled images having the second resolution and the up-sampled previous CNN data are received. Convolution is performed according to the up-sampled previous CNN data and the current down-sampled image to generate a current image segmentation result.

16 Claims, 4 Drawing Sheets

(56) References Cited

U.S. PATENT DOCUMENTS

2019/0295261 A1\* 9/2019 Kang .................... G06K 9/6262
2019/0340462 A1\* 11/2019 Pao ....................... G06K 9/4671
2019/0347804 A1\* 11/2019 Kim ......................... G06K 9/34
2019/0388064 A1\* 12/2019 Kezurer ............... A61B 8/5215

\* cited by examiner

IMAGE SEGMENTATION METHOD AND APPARATUS

RELATED APPLICATIONS

This application claims priority to U.S. Provisional Application Ser. No. 62/552,412, filed Aug. 31, 2017, which is herein incorporated by reference.

BACKGROUND

Field of Disclosure

The present disclosure relates to an image processing technology. More particularly, the present disclosure relates to an image segmentation method and an image segmentation apparatus.

Description of Related Art

Semantic image segmentation plays a crucial role in image understanding, allowing a computer to recognize objects in images. Recognition and delineation of objects is achieved through classification of each pixel in an image. Such processes have a wide range of applications in computer vision, in diverse and growing fields such as vehicle autonomy and medical imaging. Current image segmentation technologies may perform image segmentation on the same image with different scales separately and concatenate the respective image segmentation results. However, such method has to pre-define the number of the modules in the segmentation architecture. The flexibility is limited.

Accordingly, what is needed is an image segmentation method and an image segmentation apparatus to address the above issues.

SUMMARY

An aspect of the present disclosure is to provide an image segmentation method for performing image segmentation through a neural network implemented by an image segmentation apparatus. The image segmentation method includes the steps outlined below. An input image is down-sampled by a down-sampling module of the neural network to generate a plurality of down-sampled images having different resolutions each corresponds to one of a plurality of segmentation modules. For a current segmentation module of the segmentation modules of the neural network, previous convolution neural network (CNN) data having a first resolution is received by a current up-sampling unit of the current segmentation module to up-sample the previous CNN result to generate an up-sampled previous CNN data having a second resolution, wherein the previous CNN data is generated by a previous CNN unit of a previous segmentation module based on a previous down-sampled image of the down-sampled images that has the first resolution. A current down-sampled image of the down-sampled images having the second resolution and the up-sampled previous CNN data are received by a current CNN unit of the current segmentation module. Convolution is performed according to the up-sampled previous CNN data and the current down-sampled image to generate and transmit current CNN data to a next segmentation module by the current CNN unit when the current segmentation module is not a last segmentation module. Convolution is performed according to the up-sampled previous CNN data and the current down-sampled image to generate an image segmentation result by the current CNN unit when the current segmentation module is the last segmentation module.

Another aspect of the present disclosure is to provide an image segmentation apparatus that includes a storage unit and a processing module. The storage unit is configured to store a plurality of computer-executable instructions. The processing module is electrically coupled to the storage unit and is configured to retrieve and execute the computer-executable instructions to perform an image segmentation method for performing image segmentation through a neural network implemented by the processing module when the computer-executable instructions are executed. The image segmentation method includes the steps outlined below. An input image is down-sampled by a down-sampling module of the neural network to generate a plurality of down-sampled images having different resolutions each corresponds to one of a plurality of segmentation modules. For a current segmentation module of the segmentation modules of the neural network, previous convolution neural network (CNN) data having a first resolution is received by a current up-sampling unit of the current segmentation module to up-sample the previous CNN result to generate an up-sampled previous CNN data having a second resolution, wherein the previous CNN data is generated by a previous CNN unit of a previous segmentation module based on a previous down-sampled image of the down-sampled images that has the first resolution. A current down-sampled image of the down-sampled images having the second resolution and the up-sampled previous CNN data are received by a current CNN unit of the current segmentation module. Convolution is performed according to the up-sampled previous CNN data and the current down-sampled image to generate and transmit current CNN data to a next segmentation module by the current CNN unit when the current segmentation module is not a last segmentation module. Convolution is performed according to the up-sampled previous CNN data and the current down-sampled image to generate an image segmentation result by the current CNN unit when the current segmentation module is the last segmentation module.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present invention. Moreover, the operation of the described structure is not for limiting the order of implementation. Any device with equivalent functions that is produced from a structure formed by a recombination of elements is all covered by the scope of the invention. Drawings are for the purpose of illustration only, and not plotted in accordance with the original size.

Figure 1:
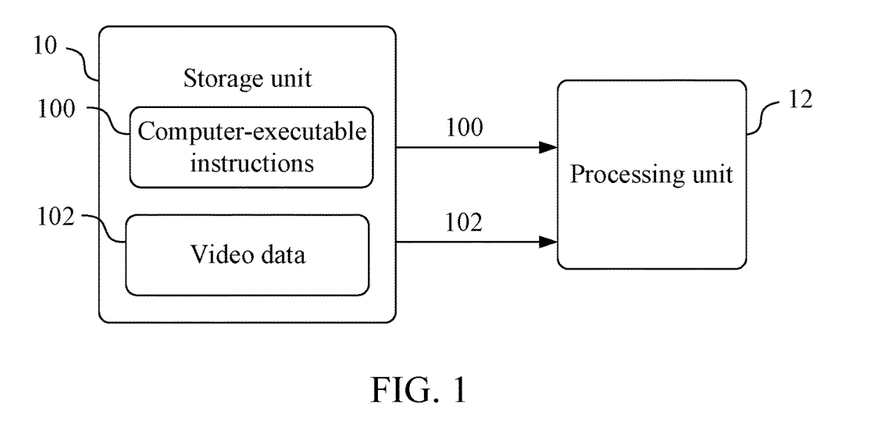
FIG. 1 is a block diagram of an image segmentation apparatus in an embodiment of the present invention.

FIG. 1 is a block diagram of an image segmentation apparatus 1 in an embodiment of the present invention. The image segmentation apparatus 1 includes a storage unit 10 and a processing module 12.

In an embodiment, the storage unit 10 can be such as, but not limited to CD ROM, RAM, ROM, floppy disk, hard disk or optic magnetic disk. The storage unit 10 is configured to store a plurality of computer-executable instructions 100.

The processing module 12 is electrically coupled to the storage unit 10. In an embodiment, the processing module 12 is configured to retrieve and execute the computer-executable instructions 100 to operate the function of the image segmentation apparatus 1 accordingly. More specifically, the processing module 12 receives video data 102 to perform image segmentation on respective images in the video data 102.

In an embodiment, the processing module 12 receives the video data 102 stored in the storage unit 10, as illustrated in FIG. 1. In other embodiments, the processing module 12 may receive the video data 102 from a remote server (not illustrated) by using such as, but not limited to a communication unit (not illustrated) through a wired or a wireless way.

Figure 2:
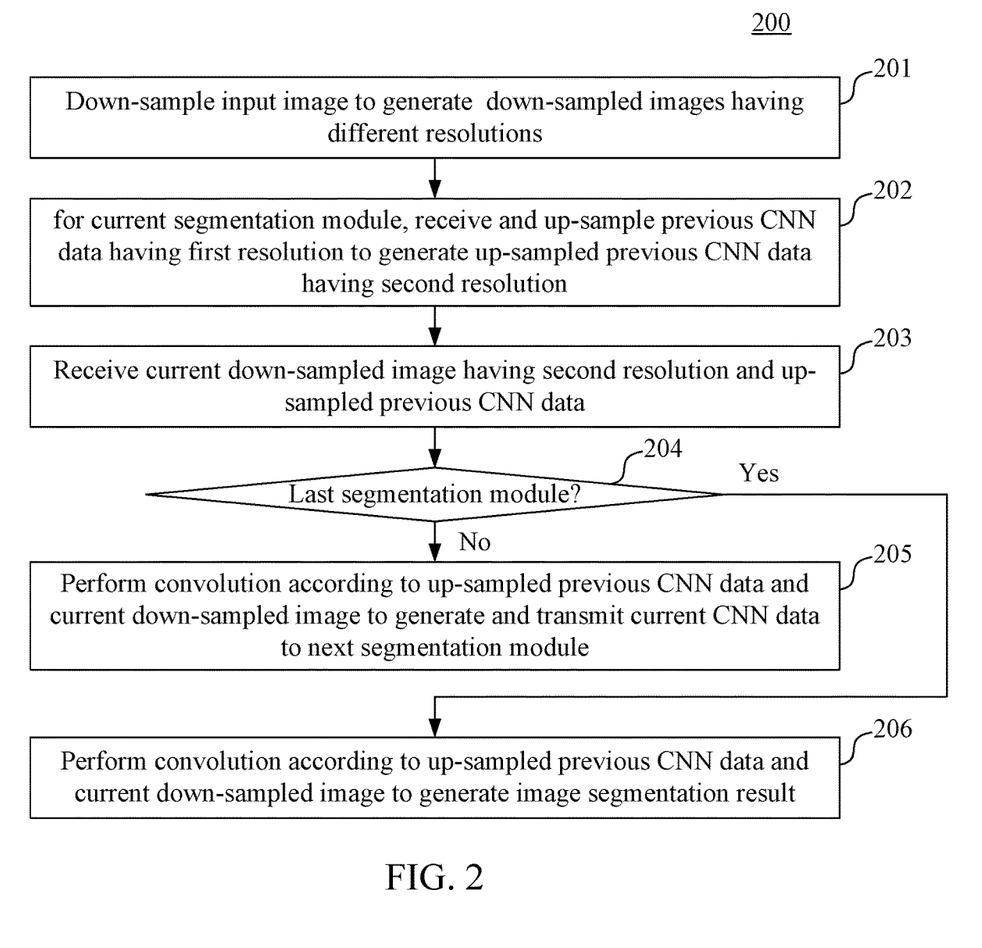
FIG. 2 is a flow chart of an image segmentation method in an embodiment of the present invention.
Figure 3:
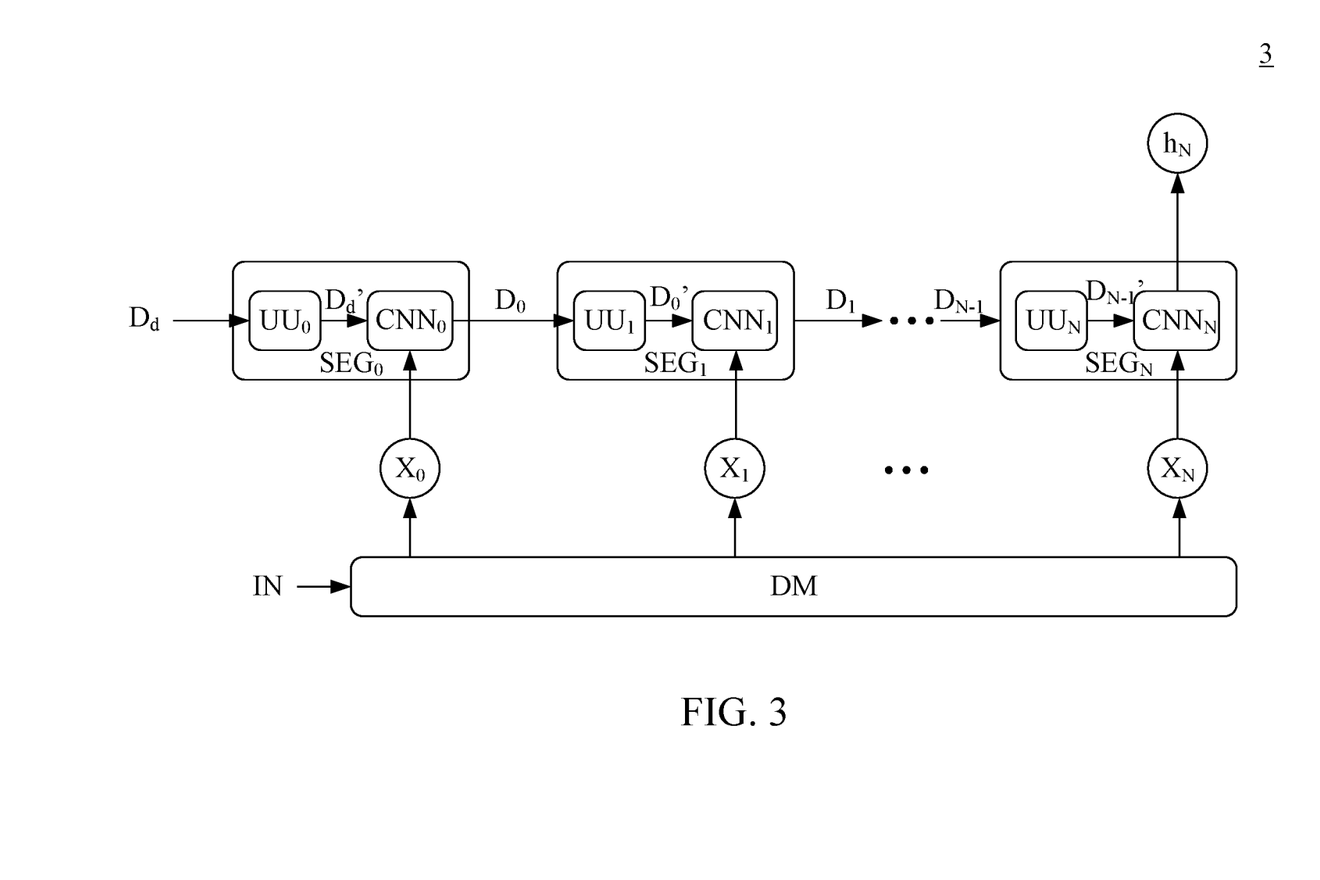
FIG. 3 is a block diagram of a neural network implemented by the image segmentation apparatus in an embodiment of the present invention.

Reference is now made to FIG. 2 and FIG. 3 at the same time. The detail of the function of the image segmentation apparatus 1 is described in the following paragraphs in accompany with FIG. 2 and FIG. 3.

FIG. 2 is a flow chart of an image segmentation method 200 in an embodiment of the present invention. The image segmentation method 200 can be used in the image segmentation apparatus 1 illustrated in FIG. 1.

FIG. 3 is a block diagram of a neural network 3 implemented by the image segmentation apparatus 1 in an embodiment of the present invention, in which the computer-executable instructions 100 operate as the neural network 3 when being executed by the processing module 12 to perform the image segmentation method 200.

In an embodiment, the neural network 3 is a recurrent neural network that includes a down-sampling module DM and a plurality of segmentation modules $SEG_0$, $SEG_1$, ... and $SEG_N$ coupled in series. Each of the segmentation modules $SEG_0$, $SEG_1$, ... and $SEG_N$ includes an up-sampling unit and a convolution neural network (CNN) unit coupled in series. More specifically, the up-sampling units $UU_0$, $UU_1$, ... and $UU_N$ are disposed in the segmentation modules $SEG_0$, $SEG_1$, ... and $SEG_N$ respectively. The convolution neural network units $CNN_0$, $CNN_1$, ... and $CNN_N$ are disposed in the segmentation modules $SEG_0$, $SEG_1$, ... and $SEG_N$ respectively and are coupled to the up-sampling units $UU_0$, $UU_1$, ... and $UU_N$ respectively.

The image segmentation method 200 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 201, an input image IN, e.g. one of the images from the video data 102 in FIG. 1, is down-sampled by the down-sampling module DM of the neural network 3 to generate a plurality of down-sampled images $X_0$, $X_1$, ... and $X_N$ having different resolutions each corresponds to one of the segmentation modules $SEG_0$, $SEG_1$, ... and $SEG_N$.

For example, the input image IN may have a resolution of 1024×768. In an embodiment, when the number of the segmentation modules is 4, the down-sampling module DM may generate four down-sampled images that are down-sampled by 1/(8×8), 1/(4×4), 1/(2×2) and 1/(1×1). More specifically, the resolutions of the four down-sampled images are 128×96, 256×192, 512×384 and 1024×768. In an embodiment, the resolution of the down-sampled image corresponding to the last segmentation module $SEG_N$ is the same as the resolution of the input image IN.

In step 202, for a current segmentation module of the segmentation modules of the neural network, previous CNN data having a first resolution is received by a current up-sampling unit of a current segmentation module to up-sample the previous CNN result to generate an up-sampled previous CNN data having a second resolution.

In an embodiment, when the current segmentation module is the segmentation module $SEG_0$, since no previous segmentation module is presented, the previous CNN data, i.e. the CNN data $D_d$, is default dummy data. The up-sampling unit $UU_0$ receives and up-samples the CNN data $D_d$ to generate the up-sampled previous CNN data $D_d'$.

When the current segmentation module is the segmentation module is one of the segmentation modules $SEG_1$, ... and $SEG_N$, the previous CNN data having the first resolution is generated by a previous CNN unit of the previous segmentation module based on a previous down-sampled image of the down-sampled images that has the first resolution.

For example, when the current segmentation module is the segmentation module $SEG_1$, the previous CNN data is generated by the CNN unit $CNN_0$ of the of the segmentation module $SEG_0$ based on the down-sampled image $X_0$ that has the first resolution, e.g. 128×96. The up-sampling unit $UU_1$ receives and up-samples the CNN data $D_1$ having the first resolution to generate the up-sampled previous CNN data $D_1'$. having a second resolution, e.g. 256×192.

In step 203, a current down-sampled image of the down-sampled images having the second resolution and the up-sampled previous CNN data are received by a current CNN unit of the current segmentation module.

Take the segmentation module $SEG_0$ as an example, when the segmentation module $SEG_0$ is the current segmentation module, the CNN unit $CNN_0$ receives the down-sampled image $X_0$ having the resolution of 128×96 as the current down-sampled image and the up-sampled previous CNN data $D_d'$ having the resolution of 128×96.

On the other hand, when the segmentation module $SEG_1$ is the current segmentation module, the CNN unit $CNN_1$ receives the down-sampled image $X_1$ having the resolution of 256×192 as the current down-sampled image and the up-sampled previous CNN data $D_0'$ having the resolution of 256×192.

In step 204, whether the current segmentation module is the last segmentation module, i.e. the segmentation module $SEG_N$ is determined.

When the current segmentation module is not the last segmentation module, in step 205, convolution is performed according to the up-sampled previous CNN data and the current down-sampled image to generate and transmit current CNN data to a next segmentation module by the current CNN unit.

Take the segmentation module $SEG_0$ as an example, when the segmentation module $SEG_0$ is the current segmentation module, the CNN unit $CNN_0$ performs convolution according to the up-sampled previous CNN data $D_d{}'$ and the down-sampled image $X_0$ to generate the current CNN data $D_0$.

On the other hand, when the segmentation module $SEG_1$ is the current segmentation module, the CNN unit $CNN_1$ performs convolution according to the up-sampled previous CNN data $D_0{}'$ and the down-sampled image $X_1$ to generate the current CNN data $D_1$.

Likewise, the steps in the image segmentation method 200 can be applied to the segmentation modules $SEG_2$ (not illustrated) . . . and $CNN_{N-1}$ such that each of the convolution neural network units $CNN_2$ (not illustrated), . . . , and $CNN_N$ performs convolution according to the up-sampled previous CNN data $D_1{}'$, . . . and $D_{N-2}{}'$ and the current image $X_2$, . . . and $X_{N-1}$ to generate the corresponding current CNN data $D_2$, . . . and $D_{N-1}$.

When the current segmentation module is the last segmentation module, e.g. the segmentation module $SEG_N$, in step 206, convolution is performed according to the up-sampled previous CNN data $D_{N-1}{}'$ and the down-sampled image $X_N$ each having the same resolution of the input image IN, e.g. 1024×768, to generate an image segmentation result $h_N$ having the same resolution (i.e. 1024×768) of the input image IN. The image segmentation result $h_N$ is the final segmentation result of the input image IN.

Figure 4:
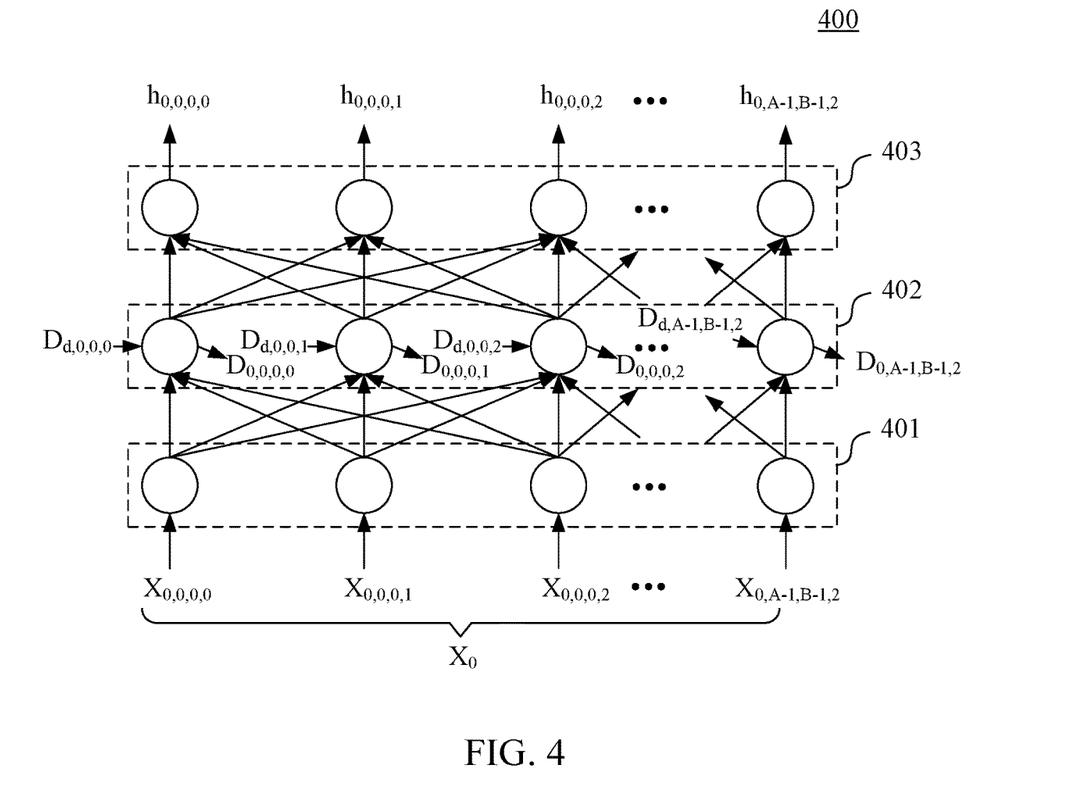
FIG. 4 is an exemplary diagram of a convolution neural network unit in an embodiment of the present invention.

Reference is now made to FIG. 4. FIG. 4 is an exemplary diagram of a CNN unit 400 in an embodiment of the present invention. In an embodiment, each of the CNN units $CNN_0$, $CNN_1$, . . . and $CNN_N$ illustrated in FIG. 3 can be implemented by the CNN unit 400.

In an embodiment, the CNN unit 400 includes an input layer 401, a hidden layer 402 and an output layer 403. In an embodiment, each of the input layer 401, the hidden layer 402 and the output layer 403 includes a plurality of computation nodes.

When the CNN unit 400 is used to implement the CNN unit $CNN_0$, the input layer 401 is configured to receive the image $X_0$ having such as, but not limited to a size of A×B and having three data channels, in which each pixel in the image $X_0$ includes three channels of data. For example, the pixel corresponding to the position (0, 0) has three channels of data including $X_{0,0,0,0}$, $X_{0,0,0,1}$ and $X_{0,0,0,2}$, in which the first digit of the index stands for the image, the second and the third index stand for the coordinate of the pixel and the fourth digit stands for the number of the channel.

As a result, the input layer 401 in the present embodiment includes A×B×3 of computation nodes from $X_{0,0,0,0}$, $X_{0,0,0,1}$, $X_{0,0,0,2}$ to $X_{0,A-1,B-1,2}$ receive the whole data of image $X_0$. In the present embodiment, the hidden layer 402 receives the up-sampled previous CNN data $D_d{}'$ having the size of A×B×3 that includes the data of $D_{d,0,0,0}{}'$, $D_{d,0,0,1}{}'$, $D_{d,0,0,2}{}'$, . . . and $D_{d,A-1,B-1,2}{}'$ as well.

As a result, the CNN unit $CNN_0$ performs convolution according to the image $X_0$ and the up-sampled previous CNN data $D_d{}'$ such that the output layer 403 generates output layer computation results that include $h_{0,0,0,0}$, $h_{0,0,0,1}$, $h_{0,0,0,2}$, . . . and $h_{0,A-1,B-1,2}$.

In an embodiment, the value of each of the output layer computation results represents the probability of the class of the segmented feature. As a result, when the CNN unit 400 is used to implement the CNN unit in the last segmentation module $SEG_N$, one of the computation result having the largest value in a group of the computation results that correspond to a pixel is selected to be the output of the pixel in the image segmentation result $h_N$. For example, if the computation result $h_{N,0,0,1}$ (not illustrated) has a value larger than the values of $h_{N,0,0,0}$ and $h_{N,0,0,2}$, the computation result $h_{N,0,0,1}$ is selected to be the output of the pixel in the image segmentation result $h_N$.

In an embodiment, the recurrent neural network 3 illustrated in FIG. 3 is an Elman network, in which the hidden layer 402 also generates hidden layer computation results that act as the previous CNN data $D_0$ that includes $D_{0,0,0,0}$, $D_{0,0,0,1}$, $D_{0,0,0,2}$, . . . and $D_{0,A-1,B-1,2}$ for the next segmentation module, e.g. the segmentation module $SEG_1$, such that the up-sampling unit $UU_1$ perform up-sampling accordingly to generate the up-sampled previous CNN data $D_0{}'$ and the CNN unit $CNN_1$ performs convolution according to the up-sampled previous CNN data $D_0{}'$ and the image $X_1$.

It is appreciated that number of the computation nodes of each of the input layer 401, the hidden layer 402 and the output layer 403 illustrated in FIG. 4 are merely an example. In other embodiments, the number of computation nodes can be different depending on practical applications.

Figure 5:
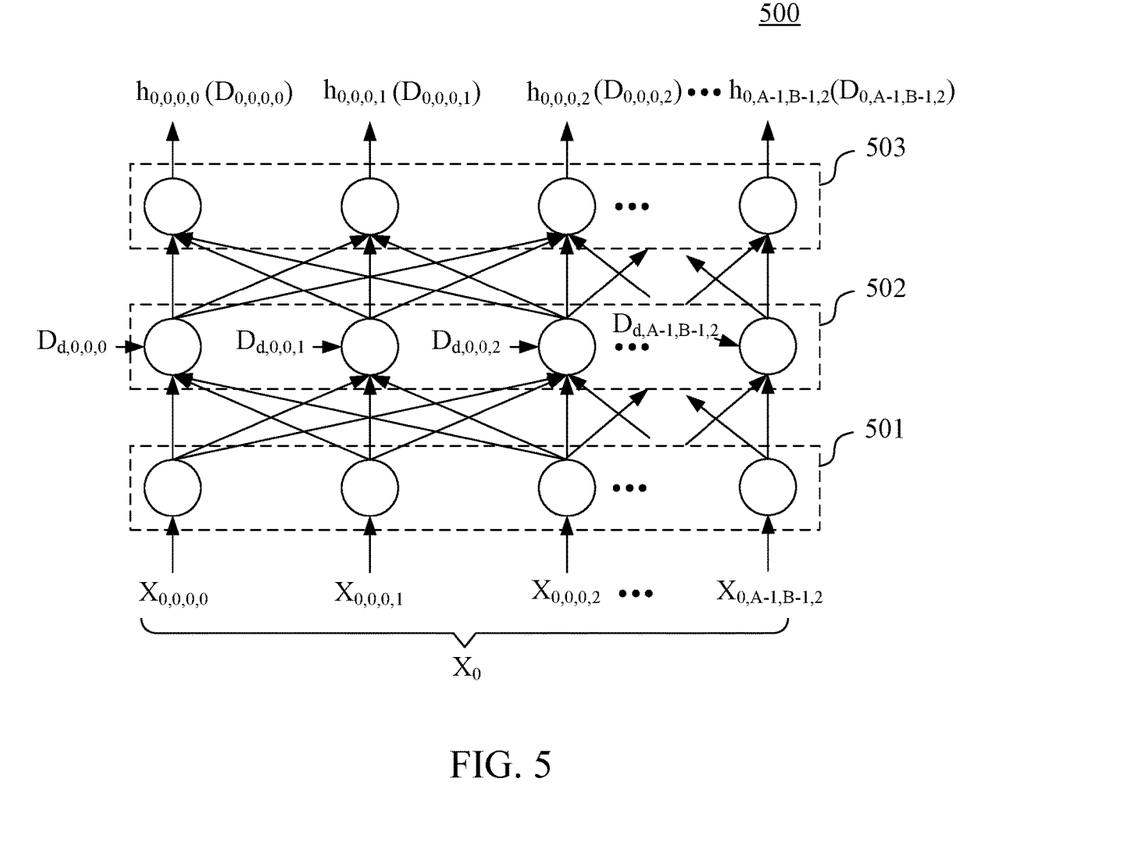
FIG. 5 is an exemplary diagram of a convolution neural network unit in an embodiment of the present invention.

Reference is now made to FIG. 5. FIG. 5 is an exemplary diagram of a convolution neural network unit 500 in an embodiment of the present invention. In an embodiment, each of the convolution neural network units $CNN_0$, $CNN_1$, $CNN_2$, . . . and $CNN_N$ illustrated in FIG. 3 can be implemented by the convolution neural network unit 500.

In an embodiment, the convolution neural network unit 500 includes an input layer 501, a hidden layer 502 and an output layer 503. In an embodiment, each of the input layer 501, the hidden layer 502 and the output layer 503 includes a plurality of computation nodes.

When the convolution neural network unit 500 is used to implement the convolution neural network unit $CNN_0$, the input layer 501 is configured to receive the image $X_0$ having such as, but not limited to a size of A×B and having three data channels, in which each pixel in the image $X_0$ includes three channels of data. For example, the pixel corresponding to the position (0, 0) has three channels of data including $X_{0,0,0,0}$, $X_{0,0,0,1}$ and $X_{0,0,0,2}$, in which the first digit of the index stands for the image, the second and the third index stand for the coordinate of the pixel and the fourth digit stands for the number of the channel.

As a result, the input layer 501 in the present embodiment includes A×B×3 of computation nodes from $X_{0,0,0,0}$, $X_{0,0,0,1}$, $X_{0,0,0,2}$ to $X_{0,A-1,B-1,2}$ receive the whole data of image $X_0$. In the present embodiment, the hidden layer 502 receives the previous CNN data $D_d{}'$ having the size of A×B×3 that includes the data of $D_{d,0,0,0}{}'$, $D_{d,0,0,1}{}'$, $D_{d,0,0,2}{}'$, . . . and $D_{d,A-1,B-1,2}{}'$ as well.

As a result, the convolution neural network unit $CNN_0$ performs convolution according to the image $X_0$ and the previous CNN data $D_d{}'$ such that the output layer 503 generates the computation results that include $h_{0,0,0,0}$, $h_{0,0,0,1}$, $h_{0,0,0,2}$, . . . and $h_{0,A-1,B-1,2}$.

In an embodiment, the value of each of the computation results represents the probability of the class of the segmented feature. As a result, when the CNN unit 500 is used to implement the CNN unit in the last segmentation module $SEG_N$, one of the computation result having the largest value in a group of the computation results that correspond to a pixel is selected to be the output of the pixel in the image segmentation result $h_N$. For example, if the computation result $h_{N,0,0,1}$ (not illustrated) has a value larger than the values of $h_{N,0,0,0}$ and $h_{N,0,0,2}$, the computation result $h_{N,0,0,1}$ is selected to be the output of the pixel in the image segmentation result $h_N$.

In an embodiment, the recurrent neural network 3 illustrated in FIG. 3 is a Jordan network, in which the output layer computation results $h_{0,0,0,0}$, $h_{0,0,0,1}$, $h_{0,0,0,2}$, . . . and $h_{0,A-1,B-1,2}$ generated by the output layer 503 act as the previous CNN data $D_0$ that includes $D_{0,0,0,0}$, $D_{0,0,0,1}$, $D_{0,0,0,2}$, . . . and $D_{0,A-1,B-1,2}$ for the next segmentation module, e.g. the segmentation module $SEG_1$, such that the up-sampling unit $UU_1$ perform up-sampling accordingly to generate the up-sampled previous CNN data $D_0$' and the CNN unit $CNN_1$ performs convolution according to the up-sampled previous CNN data $D_0$' and the image $X_1$.

It is appreciated that number of the computation nodes of each of the input layer 501, the hidden layer 502 and the output layer 503 illustrated in FIG. 5 are merely an example. In other embodiments, the number of computation nodes can be different depending on practical applications.

It is appreciated that in some embodiments, the previous CNN data can be fed to the input layer of the convolution neural network unit such that the convolution neural network unit performs convolution accordingly.

In the image segmentation apparatus 1 and the image segmentation method 200 of the present invention, the segmentation modules $SEG_0$, $SEG_1$, . . . and $SEG_N$ form a recurrent neural network such that the convolution neural network units $CNN_0$, $CNN_1$, . . . and $CNN_N$ can perform image segmentation according to the current image and the up-sampled previous CNN data. Since each of the convolution neural network units $CNN_0$, $CNN_1$, . . . and $CNN_N$ performs convolution based on different image resolutions, the information within the multiple scales can be obtained.

Further, when different numbers of images having different resolutions are required to perform image segmentation, the image segmentation apparatus 1 and the image segmentation method 200 of the present invention are flexible to increase or decrease the number of the segmentation modules. As a result, when the computation resource is not enough, the number of the segmentation modules can be adjusted to be smaller to obtain a rougher segmentation result. When the computation resource is enough, the number of the segmentation modules can be adjusted to be larger to obtain a segmentation result with higher accuracy.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image segmentation method for performing image segmentation through a neural network comprising a plurality of implemented by an image segmentation apparatus comprising:

down-sampling an input image by a down-sampling module of the neural network to generate a plurality of down-sampled images having different resolutions each corresponds to one of a plurality of segmentation modules;

for a current segmentation module of the segmentation modules of the neural network, receiving previous convolution neural network (CNN) data having a first resolution by a current up-sampling unit of the current segmentation module to up-sample the previous CNN result to generate an up-sampled previous CNN data having a second resolution, wherein the previous CNN data is generated by a previous CNN unit of a previous segmentation module based on a previous down-sampled image of the down-sampled images that has the first resolution;

receiving a current down-sampled image of the down-sampled images having the second resolution and the up-sampled previous CNN data by a current CNN unit of the current segmentation module;

performing convolution according to the up-sampled previous CNN data and the current down-sampled image to generate and transmit current CNN data to a next segmentation module by the current CNN unit when the current segmentation module is not a last segmentation module; and performing convolution according to the up-sampled previous CNN data and the current down-sampled image to generate an image segmentation result by the current CNN unit when the current segmentation module is the last segmentation module.

2. The image segmentation method of claim 1, wherein the previous CNN data comprises a plurality of previous output layer computation results outputted by an output layer of the previous CNN unit or a plurality of previous hidden layer computation results outputted by a hidden layer of the previous CNN unit.

3. The image segmentation method of claim 1, further comprising:

receiving the previous CNN data and the current down-sampled image by an input layer of the CNN unit; and performing convolution according to the previous CNN data and the current down-sampled image to generate current hidden layer computation results by a hidden layer of the current CNN unit and generate current output layer computation results by an output layer of the current CNN unit, wherein the current CNN data is either the current output layer operation results or the current hidden layer computation results.

4. The image segmentation method of claim 1, further comprising:

receiving the current down-sampled image by an input layer of the current CNN unit;

receiving the previous CNN data by a hidden layer of the current CNN unit; and performing convolution according to the previous CNN data and the current down-sampled image to generate current hidden layer computation results by a hidden layer of the current CNN unit and generate current output layer computation results by an output layer of the current CNN unit, wherein the current CNN data is either the current output layer operation results or the current hidden layer computation results.

5. The image segmentation method of claim 1, further comprising:

generating the image segmentation result by selecting a part of a plurality of current output layer operation results outputted by an output layer of the current CNN unit that has larger values than the other part of the current operation results.

6. The image segmentation method of claim 1, wherein the neural network is a recurrent neural network.

7. The image segmentation method of claim 1, wherein when the previous segmentation module does not exist, the previous image segmentation data is default dummy data.

8. The image segmentation method of claim 1, wherein when the current segmentation module is the last segmentation module, the current CNN unit performs convolution according to the up-sampled previous CNN data and the current down-sampled image each having the same resolution of the input image to generate the image segmentation result having the same resolution of the input image.

9. An image segmentation apparatus comprising:
a storage unit configured to store a plurality of computer-executable instructions; and
a processing module electrically coupled to the storage unit and configured to retrieve and execute the computer-executable instructions to perform an image segmentation method for performing image segmentation through a neural network implemented by the processing module when the computer-executable instructions are executed, wherein the image segmentation method comprises:
down-sampling an input image by a down-sampling module of the neural network to generate a plurality of down-sampled images having different resolutions each corresponds to one of a plurality of segmentation modules;
for a current segmentation module of the segmentation modules of the neural network, receiving previous CNN data having a first resolution by a current up-sampling unit of the current segmentation module to up-sample the previous CNN result to generate an up-sampled previous CNN data having a second resolution, wherein the previous CNN data is generated by a previous CNN unit of a previous segmentation module based on a previous down-sampled image of the down-sampled images that has the first resolution;
receiving a current down-sampled image of the down-sampled images having the second resolution and the up-sampled previous CNN data by a current CNN unit of the current segmentation module;
performing convolution according to the up-sampled previous CNN data and the current down-sampled image to generate and transmit current CNN data to a next segmentation module by the current CNN unit when the current segmentation module is not a last segmentation module; and
performing convolution according to the up-sampled previous CNN data and the current down-sampled image to generate an image segmentation result by the current CNN unit when the current segmentation module is the last segmentation module.

10. The image segmentation apparatus of claim 9, wherein the previous CNN data comprises a plurality of previous output layer computation results outputted by an output layer of the previous CNN unit or a plurality of previous hidden layer computation results outputted by a hidden layer of the previous CNN unit.

11. The image segmentation apparatus of claim 9, wherein image segmentation method the further comprises:
receiving the previous CNN data and the current down-sampled image by an input layer of the CNN unit; and
performing convolution according to the previous CNN data and the current down-sampled image to generate current hidden layer computation results by a hidden layer of the current CNN unit and generate current output layer computation results by an output layer of the current CNN unit, wherein the current CNN data is either the current output layer operation results or the current hidden layer computation results.

12. The image segmentation apparatus of claim 9, wherein image segmentation method the further comprises:
receiving the current down-sampled image by an input layer of the current CNN unit;
receiving the previous CNN data by a hidden layer of the current CNN unit; and
performing convolution according to the previous CNN data and the current down-sampled image to generate current hidden layer computation results by a hidden layer of the current CNN unit and generate current output layer computation results by an output layer of the current CNN unit, wherein the current CNN data is either the current output layer operation results or the current hidden layer computation results.

13. The image segmentation apparatus of claim 9, wherein image segmentation method the further comprises:
generating the image segmentation result by selecting a part of a plurality of current output layer operation results outputted by an output layer of the current CNN unit that has larger values than the other part of the current operation results.

14. The image segmentation apparatus of claim 9, wherein the neural network is a recurrent neural network.

15. The image segmentation apparatus of claim 9, wherein when the previous segmentation module does not exist, the previous image segmentation data is default dummy data.

16. The image segmentation apparatus of claim 9, wherein when the current segmentation module is the last segmentation module, the current CNN unit performs convolution according to the up-sampled previous CNN data and the current down-sampled image each having the same resolution of the input image to generate the image segmentation result having the same resolution of the input image.

* * * * *